(12) United States Patent
Holden et al.

(10) Patent No.: US 8,458,362 B2
(45) Date of Patent: Jun. 4, 2013

(54) DELIVERING CONTENT IN MULTIPLE FORMATS

(75) Inventors: Dan E. Holden, Englewood, CO (US); Austin J Vrbas, Edgewater, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 140 days.

(21) Appl. No.: 12/894,580

(22) Filed: Sep. 30, 2010

(65) Prior Publication Data

US 2012/0084463 A1     Apr. 5, 2012

(51) Int. Cl.
*G06F 15/16*    (2006.01)

(52) U.S. Cl.
USPC .......................................... 709/246; 709/217

(58) Field of Classification Search
USPC .................................. 709/217, 246
See application file for complete search history.

(56) References Cited

U.S. PATENT DOCUMENTS

| | | | | |
|---|---|---|---|---|
| 6,888,477 | B2* | 5/2005 | Lai et al. ........................ | 341/50 |
| 2004/0111476 | A1* | 6/2004 | Trossen et al. ................. | 709/206 |
| 2007/0204003 | A1* | 8/2007 | Abramson .................... | 709/217 |
| 2007/0226365 | A1* | 9/2007 | Hildreth et al. ............... | 709/231 |
| 2008/0195743 | A1 | 8/2008 | Brueck et al. | |
| 2010/0260262 | A1* | 10/2010 | Coban et al. ............. | 375/240.13 |

FOREIGN PATENT DOCUMENTS

WO     02/097584 A2    12/2002

OTHER PUBLICATIONS

Pending U.S. Appl. No. 12/906,485, filed Oct. 18, 2010, "A System, Device and Method for Transrating File Based Assets".
Alex Zambelli: "IIS Smooth Streaming Technical Overview", Internet Citation, Mar. 25, 2009, pp. 1-18, XP002620446, Retrieved from the Internet: URL:http://www.microsoft.com/downloads/en/details.aspx?FamilyID=03d22583-3ed6-44da-8464-b1b4b5ca7520 [retrieved on Jan. 21, 2011].
"OIPF Release 2 Specification HTTP Adaptive Streaming [V2.0]—[Sep. 7, 2010]", Sep. 7, 2010, XP055009601, Retrieved from the Internet: URL:http://www.oipf.tv/live/oipf/docs/Release2/OIPF-T1-R2-specification-Volume-2a-HTTP-Adaptive-Streaming-V2 0-2010-09-07.pdf [retrieved on Oct. 14, 2011].
Gerard Fernando et al: "HTTP Streaming of MPEG Media-Response to CfP", 93. MPEG Meeting; Jul. 26, 2010-Jul. 30, 2010; Geneva; (Motion Picture Expert Group or ISO/IEC JTC1/SC29/WG11), No. M17756, Jul. 22, 2010, XP030046346.
Extended European Search Report—EP 11181773—Mailign Date: Feb. 4, 2013.

* cited by examiner

*Primary Examiner* — Yves Dalencourt
(74) *Attorney, Agent, or Firm* — Banner & Witcoff, Ltd.

(57) ABSTRACT

Content may be received at an edge location in one format, but delivered to a terminal on an access network in another format. The received content may be transcoded at the edge location. The transcoded content may be stored, or immediately delivered. The transcoded content may be fragmented prior to storage. Multiple copies of the transcoded content may be maintained in multiple formats. These formats may be aligned with one another such that delivery of the content can include delivering portions of the content in one format and other portions of the content in another format.

24 Claims, 6 Drawing Sheets

DELIVERING CONTENT IN MULTIPLE FORMATS

BACKGROUND

In traditional networks, content (e.g. a movie) is often delivered from a content source to an edge location of a distribution network, and the content is then delivered to end-user terminals from the edge location via an access network. The format of the content typically remains unchanged as it travels between the content source and the terminals. Sometimes the content may need to be delivered in different formats in order to accommodate varying capabilities of different types of terminals. In such circumstances, transcoders, which may be located at the content source, transcode the content into the different formats for the different terminals. Thus, the same content may be sent over the distribution network more than once in order to deliver the content in more than one format. What is needed is an apparatus and method for more efficient delivery of transcoded content to a terminal.

BRIEF SUMMARY

This summary is not intended to identify any critical or key elements. Instead, it merely presents certain introductory concepts. The full scope of this disclosure may be appreciated upon reading the full specification and figures, of which this summary is a part.

At an edge location of a network, between a distribution network and an access network, one or more servers may receive content from the distribution network, transcode the content into one or more formats, and distribute the transcoded content over the access network. The one or more servers may also store a plurality of copies of the content, each copy encoded in a different format.

The one or more servers may begin distributing the content over the access network in response to receiving a request from a terminal on the access network. The format in which the content is distributed may be selected such that it is compatible with the terminal. This may involve identifying whether the terminal can play or view a format and/or whether there is sufficient bandwidth between the terminal and the one or more servers to deliver the format.

The transcoding may be performed such that some or all of the i-frames of each copy of the content are aligned with one another. This allows a terminal to switch between formats of the content mid-viewing without receiving frames that were already transmitted in another format.

The quality of the received content may be verified prior to transcoding and retransmission. Similarly, the quality of the transcoded content may be verified. The quality of the transcoded content may be verified by ensuring that some or all of the i-frames are aligned and by ensuring that control signals of the original content appear in the transcoded content.

The transcoded content may be fragmented and stored such that each fragment is randomly accessible. Each fragment may begin with an i-frame and be followed by p-frames and/or b-frames, and optionally by additional i-frames. The transcoded content may be fragmented whether or not the i-frames are aligned across copies of the transcoded content. Each fragment may be encapsulated in a packet, such as an IP packet, for transport across a network.

Other embodiments and variations will be apparent upon reading the detailed description set forth below. The disclosure is not intended to be limited in any way by this brief summary.

DETAILED DESCRIPTION

Figure 1:
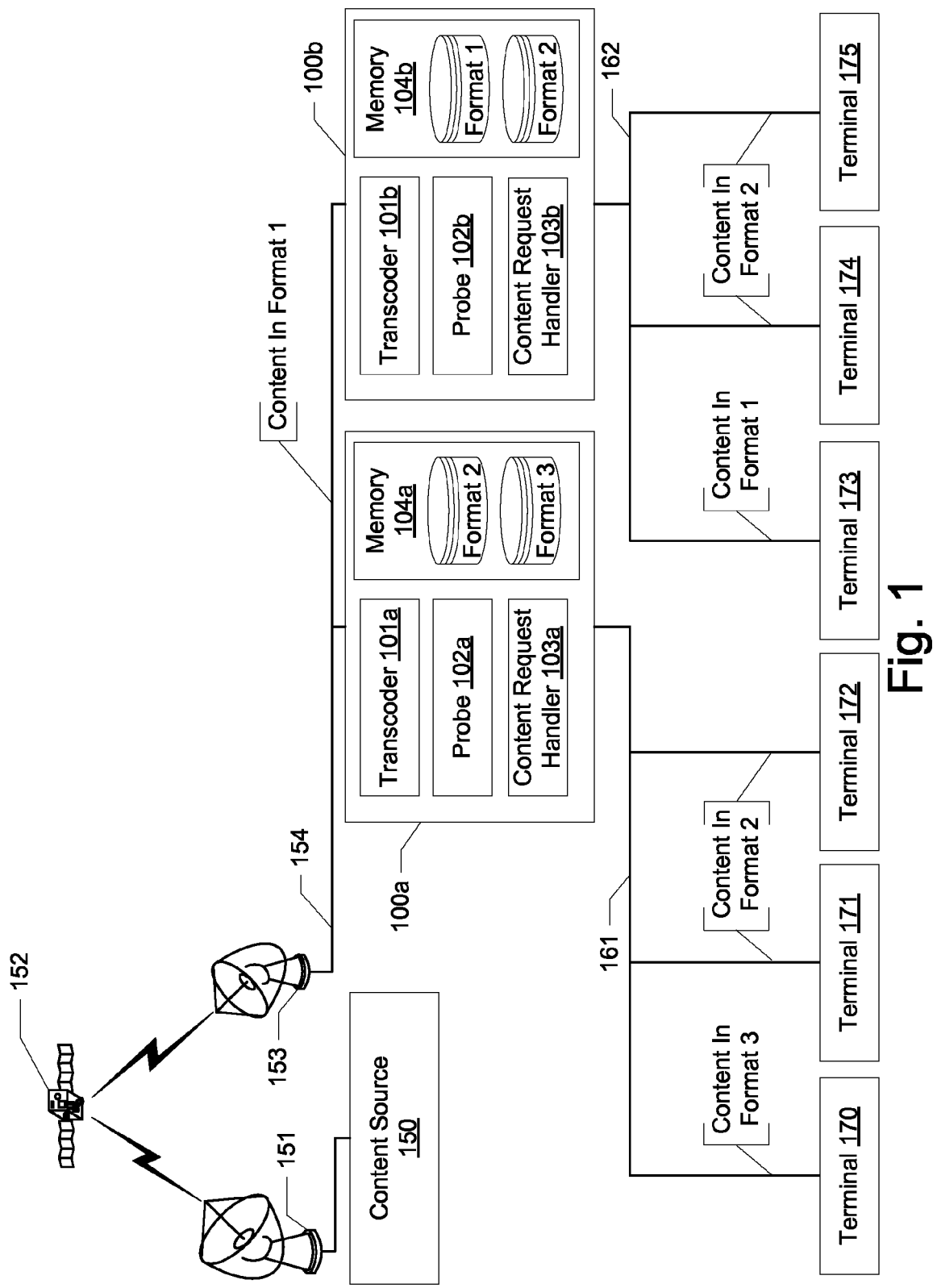
FIG. 1 illustrates an example of a distribution network and an access network in accordance with one or more aspects of the disclosure.

FIG. 1 illustrates an example of a distribution network 151-154, an access network 161 and 162, and servers 100a and 100b at a location between the distribution and access networks (e.g., an edge location). In this example, the distribution network 151-154 links content source 150 with one or more servers 100a and one or more servers 100b. Although servers 100a may be made up of more than one server, they will be referred to as server 100a for simplicity. Similarly, one or more servers 100b will be referred to as server 100b. Content, such as data, a video, and/or an audio program, may be sent from content source 150 via satellite uplink 151. Content source 150 may be a centralized repository of pre-existing video and/or audio programs. It may also be the location at which a live video stream or other content is created, such as the video feed from a live football game. The content from the content source 150 is transmitted in an initial, or first format. In the illustrative example of FIG. 1, this initial or first format is labeled "Format 1."

As seen in the example of FIG. 1, the content may be relayed in the first format by satellite 152 to receiver 153. In this example, receiver 153 is connected via communication link 154 to server 100a and server 100b. A short-range wired or wireless connection, or any other type of connection, including long-range connections, may be used. The distribution network may contain more than one content source. The content sources may be collocated, or they may also reside in a variety of locations. The content from each source may be in the same format, or the content from some or all of the sources may be in different formats. Similarly, if a content source transmits more than one piece of content, each piece of content may be in a different format.

While the example distribution network 151-154 shown in FIG. 1 includes a satellite, a variety of other network technologies may also be used to deliver content to the edge of the distribution network. Another example of a distribution network is a network that connects a content source with one or more servers located at an edge of an access network using fiber optic, coaxial cable, Ethernet, wireless connections, or the like, including a hybrid mix of connections. Networks that combine various transmission technologies to deliver content to the edge of a distribution network may be used. Similarly, various content sources may be connected to a server in different ways. For instance content source 150 is illustrated as being connected to servers 100a and 100b via satellite 152 and also via physical link 154, but another content source may be connected to sever 100*a* and/or 100*b* via only physical links of one or more types.

Server 100*a*, like server 100*b*, may receive content sent from content source 150. Servers 100*a* and 100*b* may be called edge servers, as they are located at the edge of the distribution network, which may be a large distance from content source 150 and receiver 153. The edge servers may store and/or transmit the content in the format in which it was received. For instance, memory 104*b* of server 100*b* includes the content in Format 1, and the content may be sent to terminal 173 from server 100*b* in Format 1.

An example of a format is 1920×1080 pixels per screen, 30 frames per second, progressive scan (noninterlaced) video using the H.264 codec (also known as AVC or MPEG-4 Part 10) accompanied by 5.1 channel sound encoded according to the Dolby Digital AC-3 standard. A large variety of formats exist, and more are being developed. Different pieces of content may be received in different formats. Other formats may use other resolutions, frame rates, interlacing techniques, video codecs, audio codecs, and number of audio channels. They may also vary in the amount of compression (or bit rate) applied to the source content, the audio sampling frequency, the closed captioning or subtitling standards used, the presence and type of active format descriptions used, etc. Examples of other video codecs include, for example, Widows Media 9 and MPEG-2. Examples of other audio codecs include, for example, MP3, ACC, and PCM.

A variety of different terminals may be connected to the edge servers via an access network, such as networks 161 and 162. Examples of terminals include display devices, set-top boxes, cable cards in a cable network, personal computers, and other units having a processor and/or memory. Some terminals may support a different set of encoding formats than other terminals. In some cases, there may not be a common encoding format that is supported by all of the terminals on the access network or within a user's premises. In other cases, the terminals may all support a common encoding format, but only some of them may support newer or otherwise more preferred encoding formats. Similarly, the received content may be in a format other than the preferred or universally supported encoding format. Thus, for a variety of reasons it may be desirable or even required that the edge servers transcode the received content from a first format to a second format using transcoders 101. The edge servers may store and/or transmit the content in the second format. For example, memory 104*b* of server 100*b* may also store the content in Format 2, and the content may be sent to terminals 174 and 175 in Format 2.

The received content may also be trancoded to a third format, which is labeled Format 3 in FIG. 1. The content may be stored for later distribution in memory 104*a* in this format, and it may be transmitted to terminal 170 in this format. As depicted in memories 104*a* and 104*b* of FIG. 1, the received content may or may not be stored in its original format (Format 1) after it is transcoded.

Transmissions of the transcoded content may occur according to a schedule or they may occur in real time as the content is received. They may also occur in response to a request from a terminal. For example, Terminal 171 may request a specific item of content be delivered. An example of such a request is a video on demand request. Content request handler 103*a* receives this request and may respond by having the content sent to Terminal 171 in Format 2. The content request handler 103*a* may select Format 2 because the request identified that the content is to be delivered in Format 2. Alternatively, content request handler 103*a* may select Format 2 because, for example, it was the most appropriate format in which to send the content given knowledge of the capabilities of Terminal 171, because it is the default format, or for a variety of other reasons, as will be discussed in more detail below.

The received content may be transcoded immediately after it is received, but it may also be stored and transcoded later, such as when a request for that content is received from a terminal, or when a transmission is scheduled to take place. By transcoding at a later time, the storage required by an edge server may be reduced because only one copy of the content is stored. Transcoding content multiple times, however, potentially increases power consumption and/or processor load.

In some embodiments, the transcoded content may be transmitted to terminals on the access network as well as stored at an edge location, such as in memory 104*a* of server 100*a*. In such embodiments, the same content may not be transcoded to the same format repeatedly. Instead of repeatedly transcoding, a copy of the transcoded content may be stored after the first transcoding. The stored copy, which is already transcoded, may be transmitted in response to a subsequent request for the same content encoded in the same format.

In another embodiment, content may be transcoded to some or all of the available formats prior to the time the content is requested by a terminal or made available for request. Such an embodiment may distribute over time the processor load required for transcoding. It may also reduce the required processing power by allowing the transcoding to occur slower than real-time. Combinations of the above examples may also be used. For instance, an edge server may transcode the content to some formats, such as popular formats, prior to a demand for the content, but it may not transcode the content to all supported formats prior to a demand. Thus, some formats, such as less common formats, may be transcoded only upon demand, thereby balancing storage space against processor load.

The various streams (or other types of transmissions, which may be delivered using any protocol, including, for example, IP) of content received by an edge server may be encoded according to the same codec, or the codec may vary from stream-to-stream. Regardless of what format the content is received in, the above methods of storing, transmitting, and/or transcoding the received content may be used. The same method does not need to be used for each piece of received content. For instance, it may be useful to transcode some content, such as popular content, prior to first distribution, but to not transcode other content, such as more esoteric content, until a request is received for that content to be delivered in a format other than the format in which the content was received.

The edge servers may include probes, such as probes 102*a* and 102*b*, which may comprise hardware and/or software elements that verify that the transcoders output what they were expected to output. For example, in the case of video content, the probes may ensure that the each of the formats of the content output from the transcoder are aligned such that the format used to transmit the content to a terminal may be changed in the middle of the content without retransmitting any frames. Probes may also be used to verify the quality of the received content, and potentially to trigger a request for retransmission of the received content if the quality is not as expected. The verification operations performed by probes, such as probes 102*a* and 102*b*, will be discussed in further detail below.

As seen in FIG. 1, terminals 170-172 are connected to server 100a via access network 161. Terminals 173-175 are connected to server 100b via access network 162. Access networks 161 and 162 may be of various types. Examples of types of access networks include, but are not limited to, passive optical networks (PON), digital subscriber lines (DSL), wide area wireless networks of various types, and hybrid fiber coaxial cable (HFC) networks. An access network may utilize known media access control, transport, and other communication protocols used with a particular type of access network architecture and communication technology. Like a distribution network, an access network may include various nodes, and it may combine various technologies for transmitting data.

Access networks may support a large number of terminals, such fifty, one hundred, one thousand, or more terminals. Access networks may span many miles, and they may even span hundreds or thousands of miles.

Servers 100a and 100b may be connected to a distinct set of terminals, as in the illustrative example shown in FIG. 1. However, this need not necessarily be the case. For example, in a mobile (e.g. cellular) network example implementation, a terminal may be movable, and thus it may receive signals from either or both of servers 100a and 100b, depending on its present geographic location.

Figure 2:
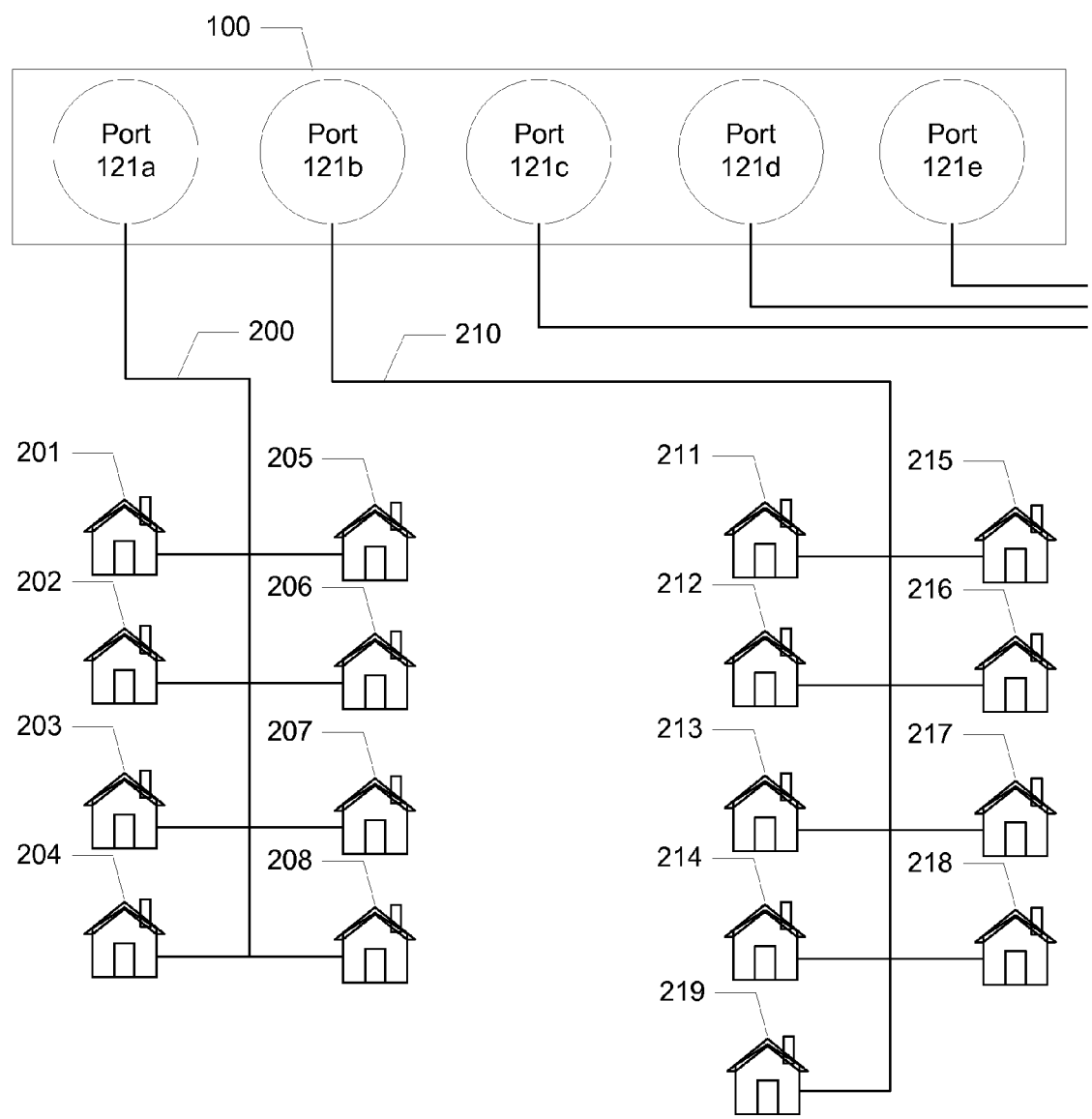
FIG. 2 illustrates an example of an access network in accordance with one or more aspects of the disclosure.

FIG. 2 illustrates another example of an access network. In this example, edge servers, such as server 100a of FIG. 1, include a variety of ports, such as ports 121a-e. These ports may each be connected to a plurality of terminals via a physical connection. In a cable network example implementation, the edge servers may be located at a central office (e.g. a headend), and each of their communications ports may serve a group of terminals that all receive the same set of signals from server 100a. The group of terminals may share the same communication link. As illustrated in the access network of FIG. 2, homes 201-208 (which may be residences, businesses, institutions, etc.) each tap into communication link 200 of the access network, which is connected to port 121a. Each home may include one or more terminals, such as a television set top box, a cable-card, or another device capable of receiving the content transmitted on line 200 of the access network. As seen in FIG. 2, homes 211-219 tap into communication line 210 of the access network, which is connected to port 121b. Thus, the terminals in homes 211-219 each receive the signals that are transmitted on line 210 of the access network.

Although in this example each of ports 121 serves a unique group of terminals, this is not necessarily the case in other examples. For instance, communications port 121 may be a single port, and the signals sent from communication port 121 may be forwarded to various portions of the access network by other hardware. For instance, in a hybrid fiber coax (HFC) network example implementation, the output of port 121 may be sent to a separate cable modem termination system (CMTS) or a converged multi-service access platform (CMAP) for distribution to homes 201-208 and/or 211-219. Other appropriate hardware may be used to forward the output of port(s) 121 to the terminals in the example of a fiber optic network. In the example of a mobile (e.g. cellular) network, the output of port(s) 121 may be forwarded to appropriate cell towers of the access network such that the signals destined for each terminal will reach the location of that terminal.

Figure 3:
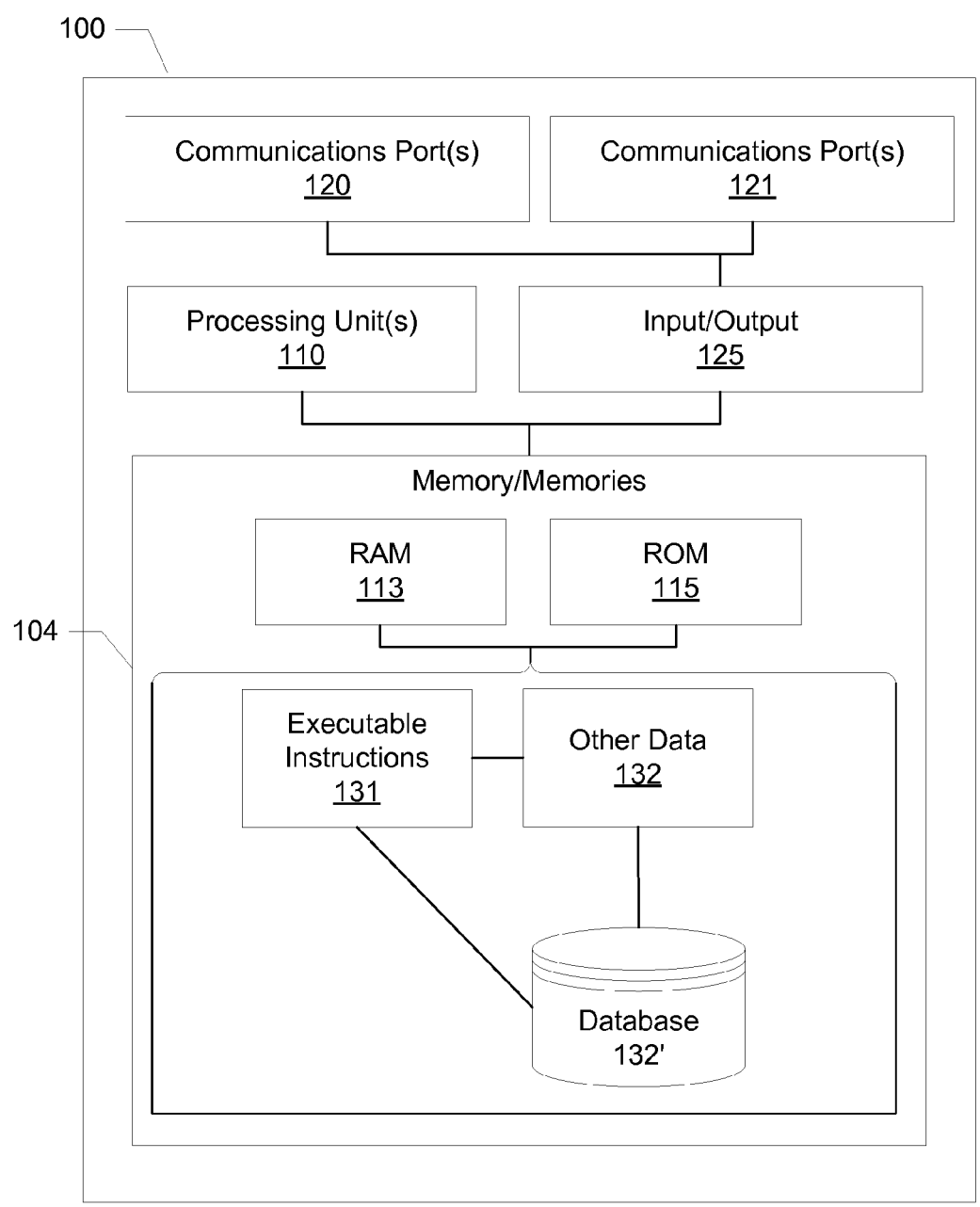
FIG. 3 illustrates an example of a server in accordance with one or more aspects of the disclosure.

FIG. 3 illustrates an example of a server of the type that may be used at the edge of the distribution network. Server 100 includes processing unit 110 and at least one communications port 120, which may be connected to one or more distribution networks. Server 100 also includes at least one communications port 121, which may be connected to an access network as described previously. The content sent and received from communications ports 120 and 121 may be communicated to processing unit(s) 110 via input/output hardware 125. This hardware may include communications controllers, modulators, demodulators, and the like. Communications ports 120 and 121 may send and/or receive information via any type of coaxial cable, Ethernet cable, fiber optic cable, wireless signal transmission, etc. Examples of wireless signal transmissions include transmissions to or from satellites as well as transmissions to or from cellular radios. The input/output hardware and/or software 125 may also include a variety of interface units and drives for reading, writing, displaying, and/or printing data or files.

Processing unit(s) 110 may include one or more processors. At least some of the processors execute instructions 131, which may be stored in a memory 104. Memory 104 may include RAM 113, ROM 115, and/or other types of data storage, such as a sequentially accessed data storage medium. Memory 104 may store executable instructions 131, such as instructions for transcoding content, handling content requests, verifying the result of a transcoding operation, and/or various other operations described herein. Memory 104 may also include other data 132. Examples of other data include event logs, performance statistics, information about subscribers, including the types of terminals used by subscribers, audio and/or video content, etc.

Some or all of executable instructions 131 and/or other data 132 may optionally be stored in a database format, such as database 132'. Databases may be internal to server 100, or they may be otherwise accessible to server 100. For example, a database may be stored in a separate database server or servers. Local copies of some or all of the databases may be stored by the memory 104 of the server 100. Information can be stored in a single database, or separated into different logical, virtual, or physical databases, depending on system design.

Those of skill in the art will appreciate that the functionality of server 100 may be spread across multiple physical devices, for example, to distribute processing load or to increase modularity. For example, some or all of the input/output hardware 125 may reside in a separate physical unit from some or all of the processing unit(s) 110 and/or some or all of the memories 104. In other words, the functional block division as shown in FIG. 3 may either correspond to or be independent of the physical implementation of the functional blocks.

One or more aspects of the present disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the present disclosure, and such data structures are contemplated within the scope of executable instructions and computer-usable data described herein.

Figure 4:
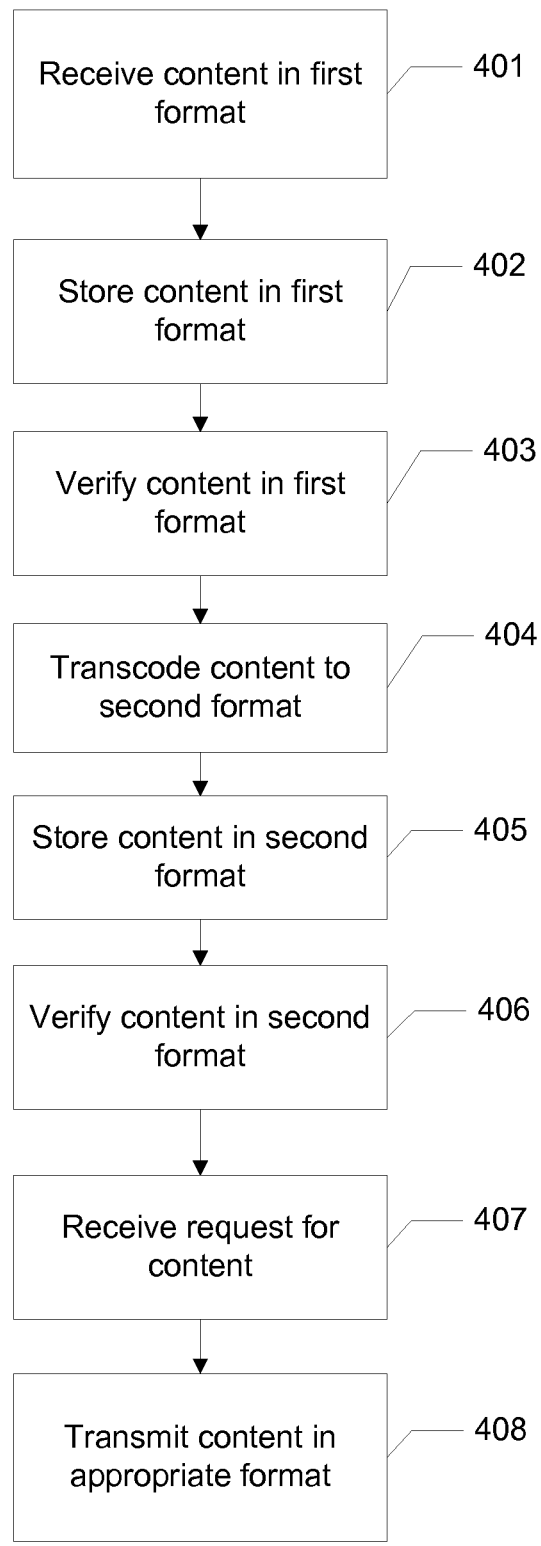
FIG. 4 shows an illustrative method of receiving and distributing content in accordance with one or more aspects of the disclosure.

FIG. 4 shows an illustrative method of receiving and distributing content. In step 401, content is received from a distribution network, or another source, in a first format. In step 402, that content is stored. As noted above, step 402 is optional, as the content may be stored only in a transcoded format, or the content may never be stored in any format. In step 403, the received content is verified. Step 403 may be completed at any time, including prior to step 402 and while the content is being received in step 401. Step 403 is also optional.

The content may be verified in a variety of different ways. For example, it may be verified to determine if any errors were introduced during transport over the distribution network. This may be accomplished, for example, by calculating a checksum for the content that was received and comparing the calculated checksum to the checksum received with the content. It may also be accomplished, for example, by detecting video jitter or other video artifacts. The content may be rejected if any errors were introduced. Alternatively, a threshold quality level or requirement may be tested for. For instance, if errors, such as excessive jitter, occur only infrequently, then the content may be accepted, but if errors occur frequently, then the content may be rejected.

If the content is rejected, a retransmission from the distribution network may be required. Where feasible, the retransmission may be obtained from a different source on the distribution network. In some situations, rejecting the content may not be feasible and/or desirable. Thus, it is also possible that content that does not meet quality requirements will not be rejected.

Whether the content is rejected or not, compliance or lack of compliance with quality requirements, including the frequency and type of any errors, may be logged and reported. Such logging may also be desirable even in the case where retransmission is able to solve any quality problems and/or where no problems were detected at all. Logging may occur at the location where the error is detected, and it may also occur at other locations. For instance, it may be desirable to report errors to a central database, which may store quality reports received from multiple locations. A quality log, whether stored locally or in a central database, may allow for the reported events to be inspected and/or visualized in a number of different formats, including graphical summaries. A user may wish to manually override default behavior based on such data or based on other information. For example, a user may instruct a server, such as server 100a, to ignore a detected quality problem or to request retransmission when it otherwise would not. Such instructions may allow for fine-tuning of a server's performance.

In step 404, the content is transcoded to a second format. As discussed above, the transcoding may occur at the time the content is received. It may also occur later, such as at a time system resources allow for transcoding to take place or when the content is first requested in a format that is not already stored. As part of the transcoding process, metadata associated with the content may also be updated. For example, if the received content was encoded at 30 frames per second, but is transcoded to only 15 frames per second, the metadata associated with the transcoded content may be modified to indicate 15 frames per second instead of 30.

In step 405, the content is optionally stored in the second format. In step 406, the transcoded content may be verified, similar to step 403 above. Additional details regarding how transcoded content may be verified are discussed below. In step 408, the content may be transmitted, via an access network for example, in an appropriate format. This step may be responsive to receiving a request for the content in step 407. An appropriate format may be either of the first or second formats in the present example.

In the case where content may be transmitted in more than one format, an edge server may store pre-determined knowledge of what formats are compatible with and should be used for each terminal. This knowledge may be obtained from an external source, or it may be obtained from the terminals themselves (e.g. automatically or through user input). For example, the terminals may request the content in a particular format. Terminals may also provide a list of formats in which the content may be delivered. This list may or may not be organized to show that some formats are more preferred than others. Terminals may also provide lists of supported and/or preferred formats independent of a request for content, such as in response to a poll or as part of a setup and/or configuration process.

Reasons beyond compatibility may also dictate which format to use when transmitting content. For instance, some terminals may be associated with users or subscribers whose service plan allows for higher quality video or audio than other users or subscribers. Similarly, some terminals may be connected to speakers and/or displays that are not capable of taking advantage of certain formats. For instance, a terminal connected to only two speakers may not gain anything by receiving six channels of audio. Thus, bandwidth on the access network can be saved and distinctions between service plans can be adhered to by delivering content to different terminals in different formats.

Another consideration when selecting a format in which to transmit content is the user's experience. For instance, network congestion or other errors may cause higher bandwidth formats to display incorrectly or to be delivered too slowly to allow for real-time display. Thus a lower-bandwidth format may be preferred. However, the network congestion may be temporary, and after the condition clears a higher-bandwidth format may be preferred due the greater amount of information in the higher-bandwidth format. Thus, it may be desirable to begin delivering content to a terminal in one format, but to change that format to a lower or higher bandwidth format in response to the conditions of the link between an edge server, or another device in the system, and the terminal. Multiple changes may occur during transmission of a single piece of content in response to varying conditions on the link. The bandwidth required of some formats may change over time. For example, video content may require more bandwidth during fast action scenes than slower-paced scenes. It may be the case that the bandwidth required during these fast action scenes exceeds the capacity of the link between the edge server and the terminal. Thus, changes in format may occur during transmission even if the bandwidth on the link does not change.

Figure 5:
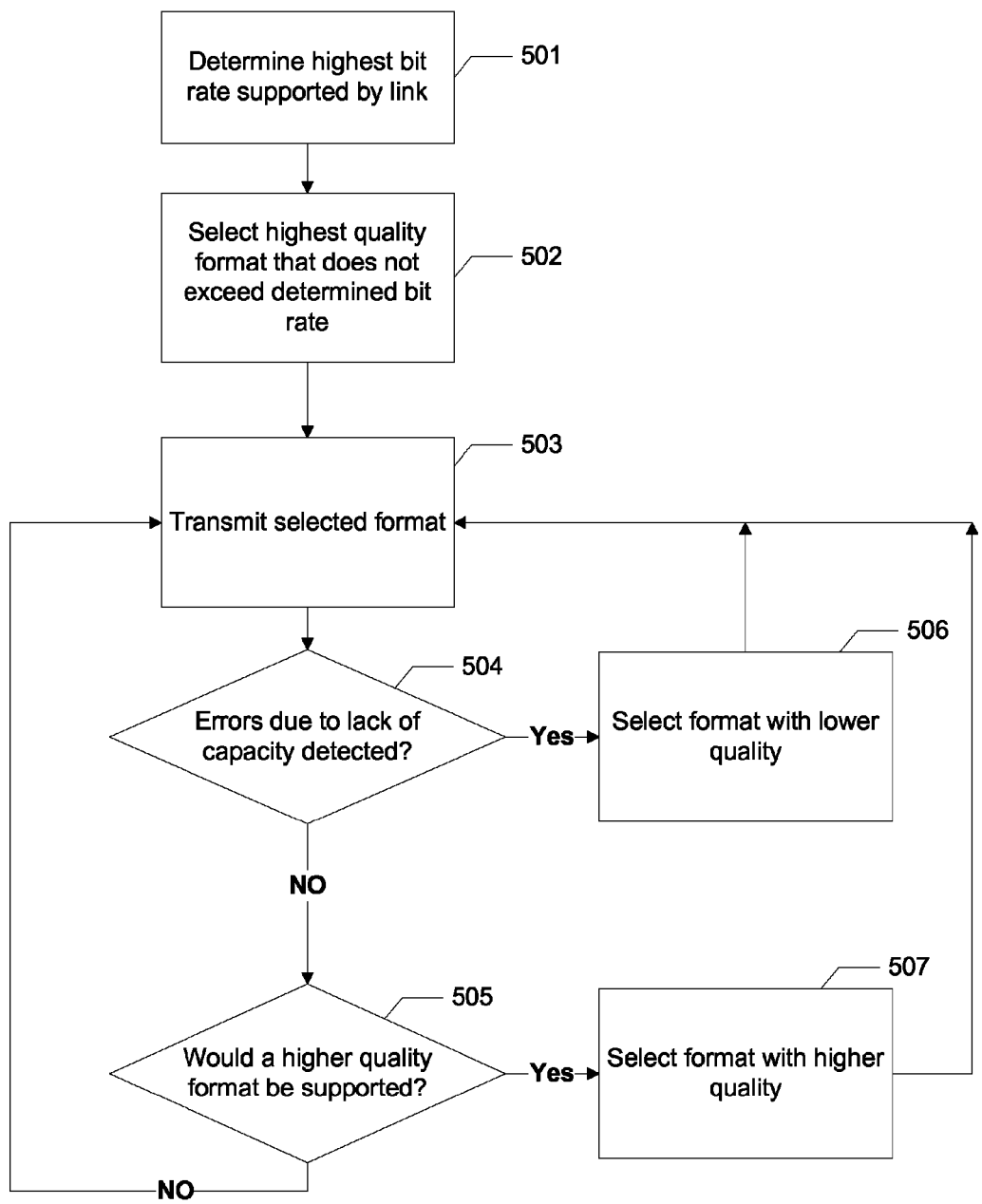
FIG. 5 shows an illustrative method of transmitting content in different formats in accordance with one or more aspects of the disclosure.

FIG. 5 shows an illustrative method of transmitting content in different formats. In step 501, the highest bit rate supported or allocated by the link is identified. Alternatively, the current capacity of a link that may be congested is determined. The link may include, for example, the access network between edge server and the terminal. In addition to considering the link, the capabilities of the terminal, the equipment connected thereto, and/or a user's subscription plan or status may also be considered, as discussed above. In step 502, the highest quality format that does not exceed the maximum supported bitrate or capacity determined in step 501 is selected. In step 503, the selected format may be transmitted. Thus, the process may start by sending the highest quality format via a stream or another type of transmission that the terminal and link can support. The content in the selected format may be transmitted using a variety of protocols, including, for example, IP. Alternatively, the process may start by sending a stream in a random or predetermined format.

In step 504, an edge server determines if errors due to lack of capacity are occurring. An error threshold may be established in order to avoid lowering the quality of the format that is transmitted due to momentary interference. If a lack of capacity is detected, a lower quality format may be selected in step 506. A lack of capacity may be a lack of bandwidth. It may also be an inability of a terminal to process the currently selected format. The lower quality format selected in step 506 may be the next lower quality format of the formats that are available. Alternatively, if the link speed has been determined, the lower quality format may be selected based on the bit rate that the link can currently support, similar to step 502, above.

If it is determined in step 505 that a higher quality format would be supported, then a higher quality format is selected in step 507. Whether a higher quality format would be supported may be determined by measuring the link speed and/or the capabilities of the terminal. It may also be determined by measuring the current error rate. (If there are no or very few errors, then a higher quality format may be used.) As with step 506, the next higher quality format may be selected. Alternatively, the format may be selected based on the bit rate supported by the link. A delay may be built into the process to avoid unnecessarily changing formats. In other words, the answer to step 504 or 505 may always be "no" unless a certain amount of time has passed. This delay may apply to increasing the quality of the selected format, but not to decreasing the quality of the selected format.

In steps 506 and 507, if a higher or lower quality format is not available, then the currently selected format may be maintained. In the case where the lowest quality format is experiencing too many errors, the transmission may cease.

Where the format used to transmit the content may change over time, as described above, it may be desirable to deliver the content such that the changes in format are not noticeable by a user consuming the content. To facilitate this, is may be desirable to perform the encoding/transcoding of the content into the various formats such that switching between the formats does not require excessive overhead, such as retransmission of video frames that were already transmitted in another format.

Many video codecs organize the compressed video into i-frames, b-frames, and p-frames. An i-frame, also known as an intra-coded frame, is a fully specified picture. A p-frame, also known as a predicted frame, contains only the changes in the image from a previous frame or frames. Using a p-frame instead of an i-frame may save space, resulting in a more compressed video stream. A b-frame, also known as a bi-predictive frame, may be even more compressible, as it contains only changes in the image from previous frame(s) and from subsequent frame(s). In some codecs, slices or macroblocks are used to sub-divide the picture, and each subdivided section may be an i, b, or p slice or block.

A video stream, for example, may be subdivided into groups of pictures. (Pictures within a video stream are also known as frames.) Such groups begin with an i-frame. The initial i-frame may be followed by i-, b-, and/or p-frames. Where the groups of pictures in an encoded stream are kept at a constant size, such as 15 frames, then an i-frame is guaranteed to occur ever 15 frames (at the beginning of each new group of pictures). I-frames may occur more frequently if the groups of pictures happen to include i-frames in subsequent positions as well as in the initial position of the group.

Where the received content is transcoded into multiple formats, switching between the formats can be accomplished without re-transmission of any frames if transcoding is performed such that the groups of pictures in the different formats are aligned. When the groups of pictures are aligned, each group of pictures begins at the same point in the content and thus contains the same portion of the original content.

Figure 6:
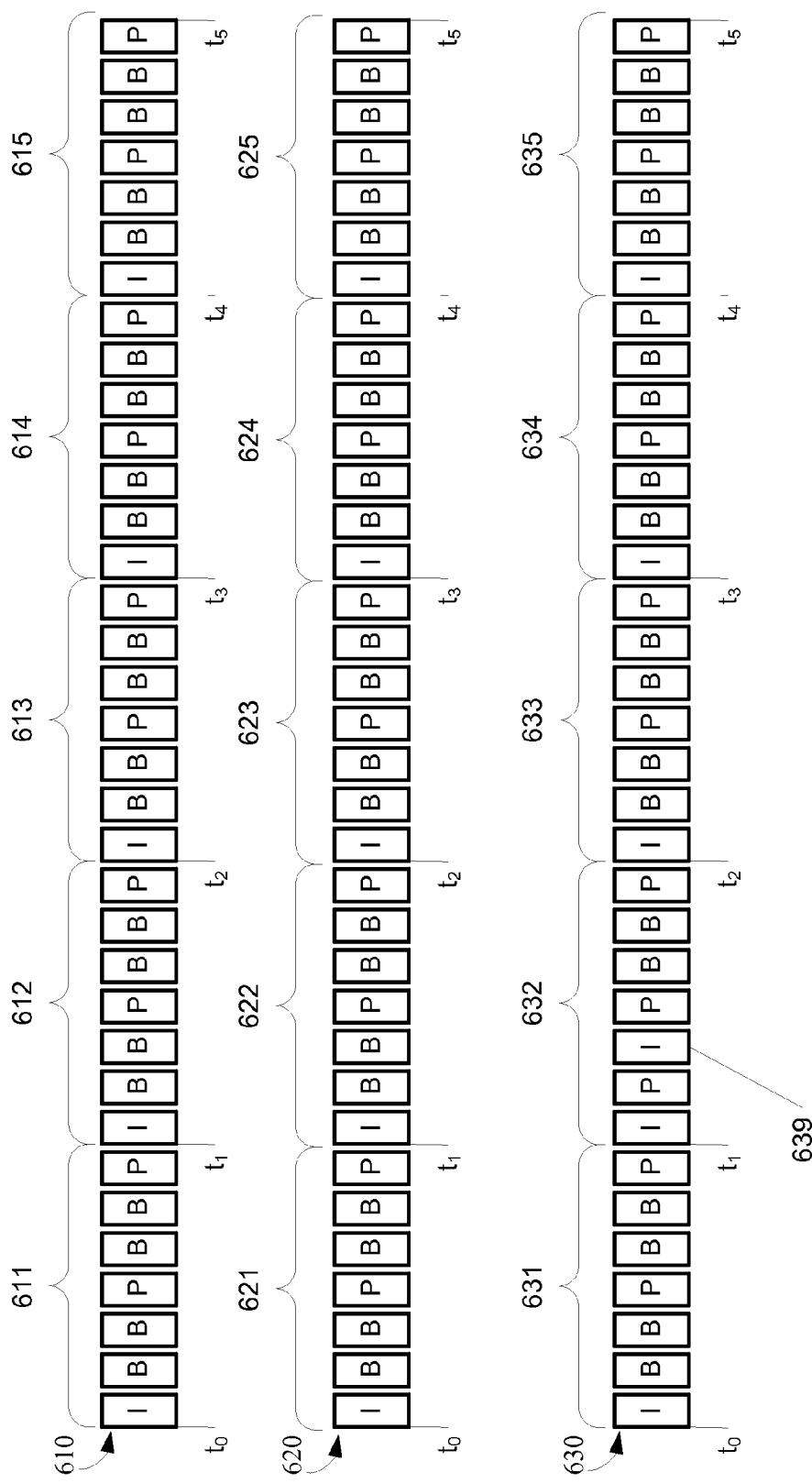
FIG. 6 illustrates three sample streams in which groups of pictures are aligned in accordance with one or more aspects of the disclosure.

FIG. 6 illustrates three sample streams labeled as stream 610, stream 620, and stream 630, each having a different format. Each stream has 7 frames per group of pictures, as can be seen by the fact that an i-frame occurs every seventh frame, as seen at time $t_0$, $t_1$, $t_2$, $t_3$, and $t_4$. The groups of pictures are identified by braces 611-615, 621-625, and 631-635. As seen by frame 639, it is possible but not required for a group of pictures to contain an i-frame in a position other than the first position.

Streams 610, 620, and 630 are aligned such that any of the three streams may be selected for transmission at each of times $t_0$, $t_1$, $t_2$, $t_3$, $t_4$, and $t_5$. For example, group 611 of stream 610 could be sent from time $t_0$ to $t_1$, at which point group 622 of stream 620 could be sent between times $t_1$ and $t_2$, at which point group of frames 633 of stream 630 could be sent, etc.

With the groups of pictures aligned, re-transmission of frames can be avoided by switching formats immediately prior to the beginning of each group of pictures. In the example shown in FIG. 6, switching formats at times $t_0$, $t_1$, $t_2$, $t_3$, $t_4$, and $t_5$ avoids the need to retransmit any frames because the first frame transmitted after each of those times is an i-frame, which, by definition, does not rely on any previous frames.

One way of achieving alignment is setting a common, constant group of pictures size for each format, ensuring that the same starting frame is used across all formats, and ensuring that no frames are added or dropped during the transcoding process.

It may be advantageous to verify that alignment was in fact achieved after transcoding has occurred. This may be accomplished by ensuring that each copy of the content has the same duration, and by ensuring that i-frames occur at the same time point in each copy of the content. If it is known that i-frames are not inserted in the middle of a group of pictures, then one way of achieving this is by verifying that i-frames occur at consistent intervals across each copy of the content. For example, it may be verified that each copy contains one i-frame every two seconds. If it is known that i-frames are not inserted in the middle of a group of pictures, that the size of a group of pictures does not vary within any copy of the content, and that the frame rate is the same across each copy, then verifying alignment may also be achieved by counting the number of i-frames in each copy of the content and ensuring that the count is the same for each copy.

Further, it may be advantageous to ensure that control signals, including extended data service signals, from the original stream are maintained in each of the transcoded streams. For example, the original stream may have contained an SCTE-35 signal, which is an example of a signal that indicates that an advertisement may be inserted. SCTE stands for Society of Cable and Telecommunications Engineers. If the signal was not maintained during the transcoding, the signal may be inserted into the transcoded stream. This may be accomplished by extracting the control signals from the original stream and re-multiplexing the transcoded stream such that it includes the extracted signals at the same or approximately the same time point as the original stream. The time point at which to insert the extracted signal may be identified by, for example, extracting the time stamp of the location at which the signal was inserted in the original stream. The time point may also be calculated by evaluating a presentation time included in the extracted signal and inserting the signal immediately before or shortly before the presentation time. The time point may also be calculated by evaluating the relative frame rate between the original and transcoded copies and using the relative frame rate to identify a frame or frames at which the signal should be inserted in the transcoded stream based on the frame or frames at which it was inserted in the original stream.

As described above, the process of transcoding to multiple streams and delivering all or a portion of those streams to the access network may occur at the edge of the network on an edge server, such as server 100. However, portions of this process may also occur at other locations. For example, the process of transcoding to multiple formats may occur at a centralized location, such as at the content source, instead of at the edge of the distribution network. In this case, the transcoded content may be received by an edge server and stored at the edge of the network for later delivery to the access network. Instead, or in addition, the transcoded content may be stored at the content source and transmitted on demand from the content source. The process of verifying that these transcoded streams have aligned groups of pictures and/or have all control signals in place may be performed at the location of the transcoder, but it may also be performed in other locations. For example, if the transcoding occurs at a content source, the verification may occur at the content source, at any point along the distribution network, at the edge of the network, at any point along the access network, and/or at the terminal.

Whether the transcoding or initial encoding occurs at a content source or at the edge of a network, the encoded content may be fragmented into individual groups of pictures prior to storage. When transmitting over a packet network, such as an IP network, the payload of each packet may be pre-formed prior to transmission. For example, each group of pictures may be transmitted in a single IP packet. Using this format, the pre-formed IP packet of a stream in any one format may be followed by the pre-formed IP packet of a stream in another format without re-transmitting or dropping any frames of the content.

The transcoded streams may also be fragmented into more than one group of pictures. These larger fragments, like the smaller fragments discussed above, may each be sent using a single IP packet. For example, a single fragment may consist of groups 631, 632, and 633 of stream 630, and these groups of frames may be contained in a single packet. Alternatively, the fragments may be split into multiple IP packets for delivery.

Saving the encoded file or stream in fragments may be advantageous where the fragments are randomly accessible. This means that the beginning of each fragment can be located on a storage medium without having to read any of the other fragments. This may be advantageous where a transmission of a stream begins in the middle of the stream instead of at the beginning of the stream. For example, if a stream in a format that has a high bit rate is being delivered, but a lower bit rate format needs to be delivered for the next group of pictures because of network congestion, the process of locating the next group of pictures in the new lower bit rate stream is more efficient when the next group of pictures can be randomly accessed.

A combination of random and sequential access may be used. For example, if fragments contain multiple groups of pictures, then the fragment may be accessed directly, but the contents of the fragment may then have to be scanned sequentially until the desired group of pictures is located within the fragment.

Random access can be achieved by maintaining an index of fragments to locations. This index may identify the fragments sequentially, by the frame number that begins or ends the fragment, by the time within the content when the fragment occurs, etc. This index may be part of a file system. For example, each fragment may be stored as a separate file. Alternatively, the fragments may be stored in a database. Neither of these examples is necessary, however. Even if the stream is saved as a single file, it may be randomly accessed if an index indicates where within the file each fragment begins. For example, an index may indicate at which byte of the file each fragment begins.

The process of fragmenting may be separated from the process of encoding. For example, an encoded stream may be sent to both a fragmenter and to another receiver of the encoded stream for which the fragmentation is not useful. An example of another receiver to which the encoded stream may be sent is a mobile digital television broadcaster. A mobile digital television broadcaster may transmit the stream in yet another format, such as ATSC-MH, which stands for advanced television systems committee mobile handheld.

The process of encoding or transcoding may occur at one location, and the process of fragmenting the stream may occur at another location. For example, the encoding or transcoding may occur at a content source, but the fragmenting may occur at the edge of a network. Similarly, the fragments may be sent to an encryption or another security device, such as a digital rights management (DRM) packager, before and/or after being stored, and the security device may be at a separate location than the encoder and/or fragmenter. A security device, such as a DRM packager, may encrypt or otherwise restrict access of the contents of the fragments to avoid unauthorized copies of the content from being made.

While the present disclosure has described specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A system comprising:
one or more servers each containing a processor and a memory, the one or more servers configured to:
receive content encoded in a first format from a distribution network that distributes content from a source to an edge location;
transcode the content to a second format;
distribute at least a portion of the transcoded content to a plurality of terminals over an access network that connects the plurality of terminals to the one or more servers;
store a plurality of copies of the content, each copy encoded in a different format;
receive a request for the content from one of the plurality of terminals;
select a copy of the content that is compatible with the terminal from which the request was received, wherein the selected copy of the content is the transcoded content that the one or more servers are configured to distribute over the access network;

cease distributing the selected copy of the content to the terminal at a point in the content; and begin distributing a portion of a second copy of the content that is encoded in a different format than the selected copy to the terminal, the portion of the second copy beginning at said point in the content.

2. The system of claim 1, wherein the one or more servers are further configured to verify that control signals embedded in the received content in the first format are embedded in each of the plurality of copies of the content.

3. The system of claim 1, wherein the copy of the content that is compatible with the terminal is selected based on an amount of congestion detected on the access network.

4. The system of claim 1, wherein the one or more servers are further configured to verify that the content received in the first format meets one or more quality requirements prior to transcoding the content to the second format.

5. The system of claim 1, wherein the access network comprises a coaxial cable network.

6. A system comprising:
one or more servers each containing a processor and a memory, the one or more servers configured to:
receive content encoded in a first format from a distribution network that distributes content from a source to an edge location;
transcode the content to a second format;
distribute at least a portion of the transcoded content to a plurality of terminals over an access network that connects the plurality of terminals to the one or more servers;
store a plurality of copies of the content, each copy encoded in a different format, the plurality of copies including a first copy and a second copy, wherein both the format of the first copy and the format of the second copy use at least two of i-frames, b-frames, and p-frames, the frames organized into groups of pictures that each begin with an i-frame;
receive a request for the content from one of the plurality of terminals;
select a copy of the content that is compatible with the terminal from which the request was received;
verify that the groups of pictures are aligned such that any group of pictures from the second copy contains the same portion of the content as a corresponding group of pictures from the first copy; and
in response to the request, distribute at least a portion of the selected copy of the content to the terminal over the access network.

7. The system of claim 6, wherein the one or more servers are further configured to store each transcoded copy of the content in a plurality of fragments that each begin with an i-frame, and wherein the one or more servers are further configured to randomly access the beginning of each fragment.

8. The system of claim 7 wherein each fragment contains only one group of pictures, and wherein the one or more servers are configured to encapsulate individual fragments in single internet protocol packets for distribution on the access network.

9. A method comprising:
receiving content from a distribution network, the content being encoded in a first format;
transcoding the content to a second format;
storing a plurality of copies of the content in a memory, each copy encoded in a different format, the plurality of copies including a first copy and a second copy, wherein one of the first copy and the second copy is in the second format, and wherein both the format of the first copy and the format of the second copy use at least two of i-frames, b-frames, and p-frames, the frames organized into groups of pictures that each begin with an i-frame;
verifying that the groups of pictures are aligned such that any group of pictures from the second copy contains the same portion of the content as a corresponding group of pictures from the first copy; and
transmitting at least a portion of the content in the second format to at least one terminal.

10. The method of claim 9, further comprising selecting the second format for transmission based on one or more formats that are compatible with the at least one terminal.

11. The method of claim 9, further comprising verifying that the content received in the first format meets one or more quality requirements prior to transcoding the content to the second format.

12. The method of claim 9, wherein the content in the second format is transmitted over an access network that comprises a coaxial cable network.

13. The method of claim 9, wherein the first format uses a different codec than the second format.

14. The method of claim 12, further comprising:
storing each transcoded copy of the content in a plurality of fragments that each begin with an i-frame; and
accessing one of the plurality of fragments non-sequentially.

15. The method of claim 14, wherein each fragment contains only one group of pictures, the method further comprising encapsulating individual fragments in single internet protocol packets; and transmitting the internet protocol packets on the access network.

16. The method of claim 9, further comprising verifying that control signals embedded in the received content in the first format are embedded in each of the plurality of copies of the content.

17. The method of claim 9, further comprising ceasing transmission to the at least one terminal of the copy of the content that is in the second format at a point in the content and transmitting a portion of the second copy of the content, which is encoded in a different format than the second format, to the at least one terminal, the portion of the second copy beginning at said point in the content.

18. The method of claim 9, wherein a copy of the content that is compatible with the terminal is selected based on an amount of congestion detected on an access network.

19. A method, comprising:
receiving content encoded in a first format from a distribution network that distributes content from a source to an edge location;
transcoding the content to a second format;
distributing at least a portion of the transcoded content to a plurality of terminals over an access network that connects the plurality of terminals to one or more servers;
storing a plurality of copies of the content, each copy encoded in a different format;
receiving a request for the content from one of the plurality of terminals;
selecting a copy of the content that is compatible with the terminal from which the request was received, wherein the selected copy of the content comprises the transcoded content;
ceasing distribution of the selected copy of the content to the terminal at a point in the content; and
beginning distribution of a portion of a second copy of the content that is encoded in a different format than the selected copy to the terminal, the portion of the second copy beginning at said point in the content.

20. One or more non-transitory computer-readable media having instructions stored thereon, that when executed by one or more computers, cause the one or more computers to:
receive content encoded in a first format from a distribution network that distributes content from a source to an edge location;
transcode the content to a second format;
distribute at least a portion of the transcoded content to a plurality of terminals over an access network that connects the plurality of terminals to one or more servers;
store a plurality of copies of the content, each copy encoded in a different format;
receive a request for the content from one of the plurality of terminals;
select a copy of the content that is compatible with the terminal from which the request was received, wherein the selected copy of the content comprises the transcoded content;
cease distribution of the selected copy of the content to the terminal at a point in the content; and
begin distribution of a portion of a second copy of the content that is encoded in a different format than the selected copy to the terminal, the portion of the second copy beginning at said point in the content.

21. A method, comprising:
receiving content encoded in a first format from a distribution network that distributes content from a source to an edge location;
transcoding the content to a second format;
distributing at least a portion of the transcoded content to a plurality of terminals over an access network that connects the plurality of terminals to one or more servers;
storing a plurality of copies of the content, each copy encoded in a different format, the plurality of copies including a first copy and a second copy, wherein both the format of the first copy and the format of the second copy use at least two of i-frames, b-frames, and p-frames, the frames organized into groups of pictures that each begin with an i-frame;
receiving a request for the content from one of the plurality of terminals;
selecting a copy of the content that is compatible with the terminal from which the request was received;
verifying that the groups of pictures are aligned such that any group of pictures from the second copy contains the same portion of the content as a corresponding group of pictures from the first copy; and
in response to the request, distributing at least a portion of the selected copy of the content to the terminal over the access network.

22. One or more non-transitory computer-readable media having instructions stored thereon, that when executed by one or more computers, cause the one or more computers to:
receive content encoded in a first format from a distribution network that distributes content from a source to an edge location;
transcode the content to a second format;
distribute at least a portion of the transcoded content to a plurality of terminals over an access network that connects the plurality of terminals to one or more servers;
store a plurality of copies of the content, each copy encoded in a different format, the plurality of copies including a first copy and a second copy, wherein both the format of the first copy and the format of the second copy use at least two of i-frames, b-frames, and p-frames, the frames organized into groups of pictures that each begin with an i-frame;
receive a request for the content from one of the plurality of terminals;
select a copy of the content that is compatible with the terminal from which the request was received;
verify that the groups of pictures are aligned such that any group of pictures from the second copy contains the same portion of the content as a corresponding group of pictures from the first copy; and
in response to the request, distribute at least a portion of the selected copy of the content to the terminal over the access network.

23. An apparatus, comprising:
at least one processor; and
a memory storing instructions that when executed by the at least one processor cause the apparatus to:
receive content from a distribution network, the content being encoded in a first format;
transcode the content to a second format;
store a plurality of copies of the content in the memory, each copy encoded in a different format, the plurality of copies including a first copy and a second copy, wherein one of the first copy and the second copy is in the second format, and wherein both the format of the first copy and the format of the second copy use at least two of i-frames, b-frames, and p-frames, the frames organized into groups of pictures that each begin with an i-frame;
verify that the groups of pictures are aligned such that any group of pictures from the second copy contains the same portion of the content as a corresponding group of pictures from the first copy; and
transmit at least a portion of the content in the second format to at least one terminal.

24. One or more non-transitory computer-readable media having instructions stored thereon, that when executed by one or more computers, cause the one or more computers to:
receive content from a distribution network, the content being encoded in a first format;
transcode the content to a second format;
store a plurality of copies of the content in a memory, each copy encoded in a different format, the plurality of copies including a first copy and a second copy, wherein one of the first copy and the second copy is in the second format, and wherein both the format of the first copy and the format of the second copy use at least two of i-frames, b-frames, and p-frames, the frames organized into groups of pictures that each begin with an i-frame;
verify that the groups of pictures are aligned such that any group of pictures from the second copy contains the same portion of the content as a corresponding group of pictures from the first copy; and
transmit at least a portion of the content in the second format to at least one terminal.

* * * * *